March 17, 1959     J. W. STUDEBAKER ET AL     2,877,567

EDUCATIONAL WORKBOOK

Filed Nov. 19, 1956

United States Patent Office 2,877,567
Patented Mar. 17, 1959

2,877,567

EDUCATIONAL WORKBOOK

John W. Studebaker and John G. Studebaker, Bronxville, N. Y.

Application November 19, 1956, Serial No. 623,002

3 Claims. (Cl. 35—9)

This invention relates to an educational workbook having leaves containing apertures through which responses to questions carried by the leaves may be written on a separate worksheet inserted beneath the apertured leaf. The workbook is so constructed that the correct answers to the questions are visible simultaneously with the questions for study purposes. A second set of correct answers is printed adjacent the appropriate aperture on the opposite side of the leaf carrying the questions for checking purposes. The worksheet is laid underneath the apertured leaf with the learner's written responses visible through the apertures. This permits the responses to be checked for accuracy against the correct answers printed adjacent the aperture.

The primary object of the invention is to provide a workbook of this kind wherein the apertures in successive leaves are so located that a smooth supporting writing surface is provided for worksheets inserted between the leaves.

Another object is to provide such a workbook wherein the leaves are arranged in pairs with questions being carried by the first leaf of the pair and correct answers being carried by the second leaf of the pair, the answers being visible for study purposes through the apertures in the first leaf.

Other objects and advantages of the invention will appear from the following description and the accompanying drawings, in which:

Figure 1 is a plan view of a workbook constructed in accordance with the invention;

Figure 2 is a similar view showing the right-hand page of Figure 1 turned over; and Figure 3 is a similar view showing the next two pages of the book.

The book shown in the drawings is of the looseleaf variety having a cover or backing 20 and binding rings 21. It will be understood, however, that the book may take other forms. Instead of binding the leaves in this fashion, they may be assembled in more permanent form by stitching or stapling and gluing. The book contains a plurality of leaves, each containing apertures. In Figure 1 the leaf 24 contains two rows of apertures 26 grouped in the lower portion of page 7 while the upper portion carries numbered items of incomplete subject matter (questions).

By referring to Figure 2 it will be noted that the reverse side of leaf 24, page 8, carries correct answers to the questions on page 7, the answers being printed adjacent the appropriate aperture to facilitate checking the written responses. The second leaf of the cooperating pair, designated by the numeral 28, has a series of apertures 30 grouped in the upper portion of the page. Thus, it will be seen that adjacent pages comprising a pair have the apertures staggered in groups so that there is a smooth solid surface beneath any of the apertures to support the worksheet on which the responses are written by the learner.

Grouped in the lower portion of page 9 in alignment with the apertures 26 in the leaf 24 are correct answers to the questions set forth on page 7 of leaf 24. These answers are sandwiched between other questions appearing on page 9 and, preferably, are printed in a different color to avoid any confusion with the questions. This second set of answers is provided for study purposes. The learner may study the questions and the corresponding answers by looking at page 7 since the correct answers, printed on page 9, are visible through the appropriate aperture at the bottom of page 7, Figure 1. For purposes of illustration, question No. 1 on page 7 requires the learner to fill in a blank. By looking through the aperture designated by the number "1" at the bottom of the page it will be obvious that the answer is "discovery."

Page 9 also carries questions which are grouped at the bottom of the page between the printed answers just referred to. These questions complement the apertures 30 in the upper portion of leaf 28.

Use of the workbook may be best understood by reference to Figure 2. The learner first studies the answers to the six questions in the lower portion of page 9. The answers appear through apertures 30, and consist of the words "steal," "rendered," "compensation," etc. printed on page 11. These words are not visible in Figure 2 because the worksheet W is inserted beneath leaf 28. The worksheet is inserted after studying and when it is desired to test the learner's knowledge of the subject. The learner writes his responses on the worksheet W through the apertures 30 in the upper portion of leaf 28, as shown in the drawing. To check the accuracy of the work, leaf 28 is turned over to the position shown in Figure 3. The worksheet W is inserted beneath the leaf and the written responses appear through the apertures 30 adjacent to the upper margin of which the correct answers are printed, as shown in Figure 3.

Page 11 of leaf 34 is identical to page 9 except for the subject matter and the location of the apertures. Apertures 36 in leaf 34 are grouped in the lower half of the page and are, hence, staggered with respect to apertures 30. The use of the material is precisely as described above with respect to other pairs of cooperating pages. Page 11, of course, cooperates with page 13.

Where confusion might possibly result when two answers appear adjacent each other, the correct answer may be printed in a color different from the other. For example, if worksheet W were not inserted beneath leaf 28, page 9 (Figure 2), two answers would be visible—one through and one adjacent each aperture 30. Each question and the corresponding answer are printed in one color (question No. 1 and its answer appearing through the aperture numbered "1"). The answers printed above the apertures ("Favorite") for checking purposes and which cooperate with subject matter on another page may be printed in a contrasting color.

In order to utilize economically all of the pages of the workbook, pages 8 and 10 are designed to cooperate in precisely the same manner as pages 7 and 9 just described. Questions appearing on page 10 in the bottom portion thereof are answered by writing through the associated aperture at the top of the page on a worksheet W. The written answers on worksheet W, shown in Figure 3, are not the answers to questions on page 10. Page 10 is being used for checking in the illustration. The worksheet obscures the correct printed answers appearing on page 8. These answers are shown in the view of Figure 2. To check the written responses the worksheet W is placed beneath page 9 of leaf 28. The written responses may then be checked against the correct answer which is printed on page 9 just above the appropriate aperture 30.

Other modifications may be made in the invention without departing from the true scope and spirit thereof. It is our intention not to limit the invention to the particu-

We claim as our invention:

1. An educational workbook for use with insertable worksheets on which answers may be written by a learner comprising pairs of leaves containing non-overlapping apertures, the apertures in said first leaf of said pair being grouped in the upper portion thereof and the apertures in the second leaf of said pair being grouped in the lower portion thereof, thus providing a smooth supporting writing surface for a worksheet inserted beneath the first leaf of said pair and on which answers are written through the apertures, each of said leaves carrying on one side questions associated with its apertures and on the other side correct answers to said questions adjacent appropriate apertures for checking written answers, duplicate correct answers also being carried by an underlying leaf and visible through said apertures for study purposes, said duplicate answers being obscured by said worksheet when inserted.

2. The educational workbook of claim 1 wherein each of said questions and said duplicate correct answer are printed in one color, while other answers appearing on the same side of the leaf are printed in a contrasting color.

3. The educational workbook of claim 1 wherein both sides of each leaf carry questions and duplicate correct answers on one side, and apertures with printed answers adjacent thereto on the other side.

References Cited in the file of this patent

UNITED STATES PATENTS

| | | |
|---|---|---|
| 1,157,599 | Studebaker | Oct. 19, 1915 |
| 1,539,397 | Matravers | May 26, 1925 |
| 1,617,657 | Studebaker | Feb. 15, 1927 |

OTHER REFERENCES

Ser. No. 418,491, Routin (A. P. C.), published Apr. 27, 1943.